(12) United States Patent
Ryan et al.

(10) Patent No.: US 10,426,296 B2
(45) Date of Patent: Oct. 1, 2019

(54) COFFEE GRINDER

(71) Applicant: Van Deuce Pty Ltd, New South Wales (AU)

(72) Inventors: Jessica Louise Ryan, New South Wales (AU); Anouk Janna Marie Greeve, New South Wales (AU); Luciano Papi, New South Wales (AU)

(73) Assignee: VAN DEUCE PTY LTD, New South Wales (AU)

( * ) Notice: Subject to any disclaimer, the term of this patent is extended or adjusted under 35 U.S.C. 154(b) by 344 days.

(21) Appl. No.: 15/104,906

(22) PCT Filed: Dec. 19, 2014

(86) PCT No.: PCT/AU2014/001151
§ 371 (c)(1),
(2) Date: Jun. 15, 2016

(87) PCT Pub. No.: WO2015/089567
PCT Pub. Date: Jun. 25, 2015

(65) Prior Publication Data
US 2016/0316970 A1    Nov. 3, 2016

(30) Foreign Application Priority Data

Dec. 20, 2013  (AU) .............................. 2013905008
Jul. 14, 2014  (AU) .............................. 2014902706

(51) Int. Cl.
*A47J 42/00* (2006.01)
*A47J 42/10* (2006.01)
(Continued)

(52) U.S. Cl.
CPC .............. *A47J 42/10* (2013.01); *A47J 42/00* (2013.01); *A47J 42/02* (2013.01); *A47J 42/40* (2013.01); *A47J 42/54* (2013.01)

(58) Field of Classification Search
CPC ............ A47J 42/10; A47J 42/00; A47J 42/40
(Continued)

(56) References Cited

U.S. PATENT DOCUMENTS 2,955,768 A * 10/1960 Engi ....................... A47J 42/54
                                                    241/245
4,510,853 A *  4/1985 Takagi ................. A47J 31/0573
                                                    241/277
(Continued)

FOREIGN PATENT DOCUMENTS

| AU | 2012209041 | 2/2013 |
|---|---|---|
| CN | 102319031 | 1/2012 |

(Continued)

OTHER PUBLICATIONS

International Search Report and Written Opinion for Application No. PCT/AU2014/001151 dated Mar. 18, 2015 (16 pages).
(Continued)

*Primary Examiner* — Faye Francis
(74) *Attorney, Agent, or Firm* — Crowe & Dunlevy, P.C.

(57) ABSTRACT

An apparatus for grinding coffee beans having a hopper arranged to receive and dispense coffee beans. The coffee grinder also includes a conical burr arranged to grind the coffee beans dispensed by the hopper. The apparatus may be employed to grind roasted coffee beans for use in a coffee extraction (conventional coffee machines), for example in a cafe.

20 Claims, 17 Drawing Sheets

(51) Int. Cl.
*A47J 42/40* (2006.01)
*A47J 42/02* (2006.01)
*A47J 42/54* (2006.01)

(58) Field of Classification Search
USPC .................................. 241/100, 245; 366/138
See application file for complete search history.

(56) References Cited

U.S. PATENT DOCUMENTS

| | | | | |
|---|---|---|---|---|
| 5,386,944 | A | * | 2/1995 | Knepler ............... A47J 42/38 |
| | | | | 241/135 |
| 5,522,556 | A | | 6/1996 | Knepler et al. |
| 5,865,383 | A | * | 2/1999 | Ford ................... A47J 42/40 |
| | | | | 241/100 |
| 6,095,032 | A | * | 8/2000 | Barnett ............... A47J 31/404 |
| | | | | 100/145 |
| 6,572,036 | B2 | | 6/2003 | Glucksman et al. |
| 6,578,726 | B1 | * | 6/2003 | Schaefer ............ B65D 47/265 |
| | | | | 215/387 |
| 6,715,706 | B1 | * | 4/2004 | Planca ............... A47J 43/0716 |
| | | | | 241/282.2 |
| 7,934,670 | B2 | | 5/2011 | Ford |
| 8,297,545 | B1 | * | 10/2012 | Lassota ............... A47J 42/38 |
| | | | | 241/100 |
| 8,490,902 | B2 | * | 7/2013 | Keller ................. A47J 31/42 |
| | | | | 241/30 |
| 9,033,267 | B2 | * | 5/2015 | Carbonini ............ A47J 42/00 |
| | | | | 241/66 |
| 2003/0129286 | A1 | * | 7/2003 | Knepler ............... A47J 31/057 |
| | | | | 426/231 |
| 2007/0187534 | A1 | * | 8/2007 | Anson ................. A47J 42/18 |
| | | | | 241/92 |
| 2010/0011975 | A1 | | 1/2010 | Mazzer |
| 2010/0170971 | A1 | * | 7/2010 | Doglioni Majer ...... A47J 42/18 |
| | | | | 241/30 |
| 2012/0001005 | A1 | * | 1/2012 | Kroesen ............. A47J 42/16 |
| | | | | 241/257.1 |
| 2012/0087203 | A1 | * | 4/2012 | Willaims ............. B01F 13/04 |
| | | | | 366/138 |
| 2016/0007796 | A1 | * | 1/2016 | de Graaff ............ A47J 31/42 |
| | | | | 99/280 |
| 2016/0192809 | A1 | * | 7/2016 | Bakke ................. A47J 42/06 |
| | | | | 241/101.2 |

FOREIGN PATENT DOCUMENTS

| | | | | |
|---|---|---|---|---|
| GB | | 844438 | 8/1960 | |
| WO | | 2011109873 | 9/2001 | |
| WO | | 2013015801 | 1/2013 | |
| WO | WO2011109873 | A1 * | 9/2015 | ............. A47J 42/08 |

OTHER PUBLICATIONS

International Preliminary Report on Patentability for Application No. PCT/AU2014/001151 dated Mar. 22, 2016 (53 pages).

* cited by examiner

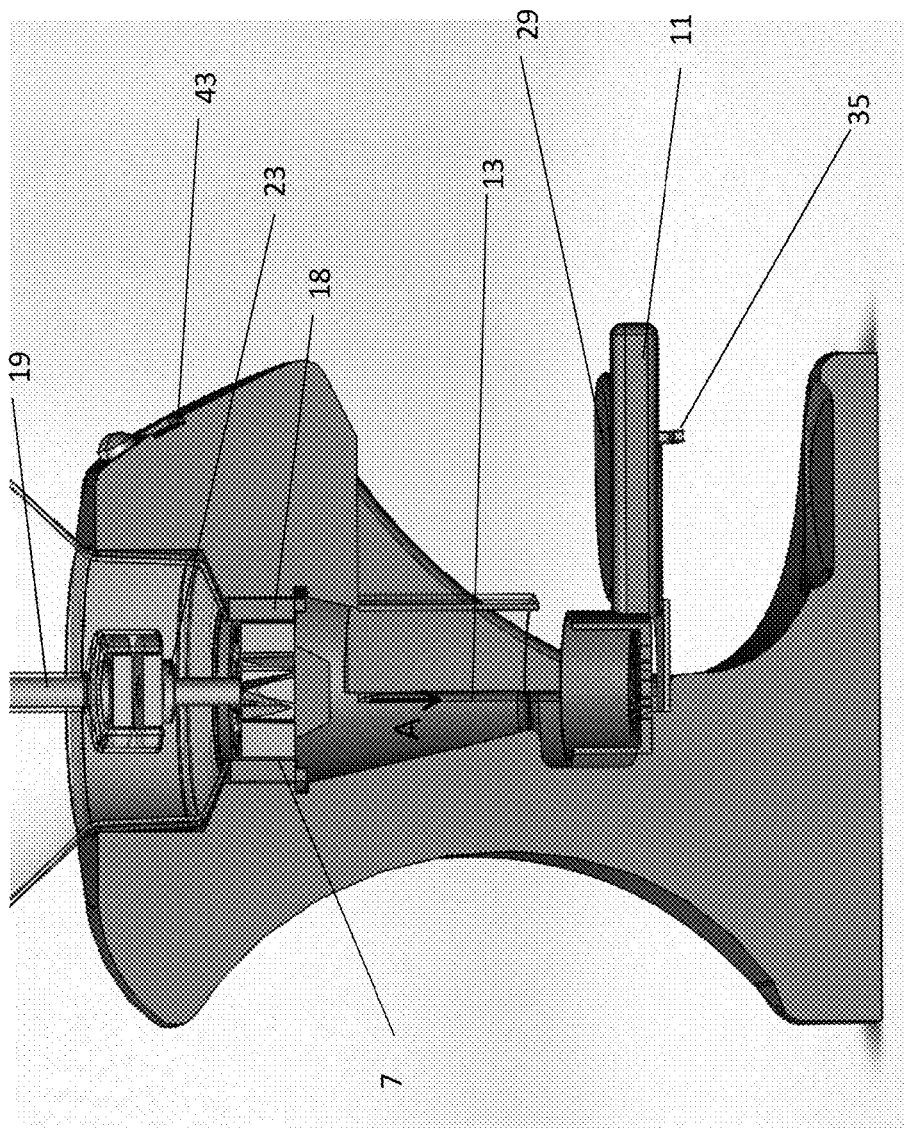
Fig. 5

COFFEE GRINDER

TECHNICAL FIELD

This disclosure relates to an apparatus for grinding coffee beans. The apparatus comprises a hopper arranged to receive and dispense coffee beans. The coffee grinder also includes a conical burr arranged to grind the coffee beans dispensed by the hopper. The apparatus may be employed to grind roasted coffee beans for use in a coffee extraction (conventional coffee machines), for example in a cafe.

BACKGROUND ART

Processing coffee beans to produce a beverage includes the steps of roasting, grinding and extracting. The selected granule size (course or fine) of the ground coffee can depend on the method utilised to brew or extract the coffee. When extracting coffee (for example to produce espresso), a fine coffee grind can be produced immediately prior to extraction. The fineness of the ground coffee beans facilitates an increase in pressure during extraction and assists to produce a crema. The granule size of the ground coffee beans, freshness of the coffee beans, quantity of the ground coffee beans, the length of extraction and the pressure of water during an extraction all affect the flavour of the extracted coffee. Producing a good quality coffee extraction can be an art form that takes years to master.

Known coffee grinders designed to produce finely ground coffee beans for use with extraction machines include a hopper, blades (conical burrs or flat burrs), a timer and a support for a portafilter. Ground coffee travels from the blades through a passage to the portafilter. A disadvantage of known coffee grinders is that about 5 to 15 grams of ground coffee beans is retained in the coffee grinder between extractions. This is particularly problematic as ground coffee quickly loses its volatiles (flavour and aroma) once ground and, if left for too long, becomes stale. When the retained ground coffee beans mix with freshly ground beans this can greatly affect the extraction process and the resultant flavour of the extracted coffee. To avoid this problem, some baristas constantly purge the grinder to remove this stale coffee before filling the portafilter. This results in large quantities of wasted coffee beans.

A further problem of known coffee grinders is the inconsistency of the dose (the quantity of ground coffee beans produced). Once heated, ground coffee beans clump together and can become suspended in the grinder between the blades and the exit chute. This retained ground coffee may be dislodged intermittently, thereby adding extra ground coffee to each dosage. The vibration of the grinder and the action of collapsing (knocking the grouphead to settle the ground coffee beans) also causes this retained coffee to drop into the portafilter. Given that tenths of a gram of ground coffee affects the extraction process, the retained coffee can also affect the flavour of the extracted coffee.

Known grinders use flat burr or conical burr blades. A problem with these blades is that they overheat with frequent use. The motor may also be located directly below the blades, which further accentuates the problem of overheating.

The above references to the background art do not constitute an admission that the art forms part of the common general knowledge of a person of ordinary skill in the art. The above references are also not intended to limit the application of the coffee grinder as disclosed herein.

SUMMARY

Disclosed herein is an apparatus for discharging ground coffee beans. The apparatus may comprise a first container for the retention of coffee beans therein, the first container having a first aperture arranged to receive coffee beans therethrough, and an opposing second aperture arranged to dispense coffee beans therethrough. The apparatus may comprise a conical burr grinder arranged to grind the coffee beans dispensed through the second aperture of the first container. The apparatus may comprise a motor arranged to drive the conical burr grinder, the motor being disposed within the first container and above the conical burr grinder in use, wherein the positioning of the motor within the first container is such that there is an evenly distributed weight of the coffee beans retained within the first container on the conical burr grinder. The apparatus may comprise a motor support portion disposed within the first container, the motor support portion being arranged to support the motor directly above the grinder and to separate the motor from the coffee beans retained within the first container. In some forms, the conical burr grinder may be arranged such that it is able to vertically discharge the ground coffee beans. In some forms, the apparatus may be arranged such that a second container is able to be positioned vertically below the conical burr grinder to receive the vertically discharged ground coffee beans from the grinder.

The apparatus, in the form of a coffee grinder, may be used in the café industry to accurately grind coffee beans for use in the coffee extraction process. The vertical discharge of coffee beans means that the amount coffee beans retained in the coffee grinder between grinds is significantly reduced or eliminated completely.

In some forms, the apparatus may comprise a removable lid arranged to cover the first aperture of the first container. In some forms, the lid may comprise a plurality of ventilation apertures formed therethrough, the ventilation apertures being aligned in use with the motor support portion to allow for heat generated by the motor to be released from the first container.

In some forms, the second container may be supported by the apparatus at a position whereby the second container is able to receive a direct and unrestricted flow of the ground coffee beans from the conical burr grinder.

In some forms, the conical burr grinder may be rotatable to grind the dispensed coffee beans such that the second container is able to receive the direct and unrestricted flow of the ground coffee beans from the conical burr grinder.

In some forms, the discharged ground coffee beans can be received by a second container. The second container may be in the form of a portafilter supported in a group handle, for use in the coffee extraction process.

In some forms, the second container can be supported by the apparatus at a position whereby the second container is able to receive a direct and unrestricted flow of the ground coffee beans. In some forms, the second container can be supported vertically below the grinder.

In some forms, the apparatus can further comprise a channel, the channel being arranged to receive the ground coffee beans discharged by the grinder and deliver the ground coffee beans to the second container.

In some forms, the conical burr grinder may comprise two conical burrs that are adjustable to vary the distance between them, adjustment of the conical burrs causing the ground coffee beans to vary in fineness. As such, a user can manually calibrate the grinder to discharge a required particle size of coffee beans.

In some forms, the apparatus can further comprise a mechanically powered shaft arranged to rotate the at least one of the conical burrs. Rotation of the conical burr grinds the roasted coffee beans dispensed from the hopper.

In some forms, the apparatus can further comprise a motor arranged to rotate the mechanically powered shaft. In some forms, a shaft of the motor can be magnetically coupled to the mechanically powered shaft, whereby rotation of the motor shaft is translated to the mechanically powered shaft to inturn engage and rotate at least one of the conical burrs.

In some forms, the magnetically coupling can be such as to also allow the first container to be removable from the apparatus. In some forms, the motor can be located above the grinder in use. In some forms, the motor may be located within the first container.

In some forms, a shaft of the motor can be mechanically coupled to the mechanically powered shaft, whereby rotation of the motor shaft is translated to the mechanically powered shaft to inturn engage and rotate at least one of the conical burrs. In some forms, the mechanical coupling can be such as to also allow the first container to be removable from the apparatus.

In some forms, the mechanical coupling can comprise a female portion mounted to the mechanically powered shaft that receives a male portion mounted to the motor shaft, the male and female portions having co-operating teeth that engage to rotate the conical burr upon rotation of the motor shaft.

In some forms, the motor support portion comprises a support cylinder that separates coffee beans disposed within the first container from the motor.

In some forms, the apparatus can further comprise a worm gear assembly to vary the distance between the two burrs. This allows for minor adjustments of the conical burrs such that a user can adjust the size of the ground coffee beans.

In some forms, the worm gear assembly can comprise an elongate threaded stem that protrudes from the grinder such that a user can manually rotate the stem to cause the distance between the burrs to vary.

In some forms, the worm gear assembly can further comprise teeth disposed about a periphery of a component of the grinder, the teeth being arranged to co-operate with the threads of the elongate stem, which engagement causes the component to in turn act on the conical burr to vary the distance between the two burrs when the elongate stem is rotated.

In some forms, the apparatus can further comprise a slidable gate between the first container and the grinder, the slidable gate operable to allow the first container to dispense the coffee beans. The slidable gate allows a user to remove the first container with unground coffee beans inside.

In some forms, the apparatus can further comprise a scale arranged to weigh the discharged beans in the second container. The scale ensures that an accurate dose of ground coffee may be discharged from the coffee grinder.

In some forms, the scale can be positioned in the apparatus adjacent to where the beans are discharged into the container, whereby the beans discharged into the container are able to be weighed immediately following discharge.

In some forms, the apparatus can further comprise the scale being positioned in the apparatus: such that the second container is located on the scale as the beans are discharged into the second container; or laterally adjacent to the second container when the beans are being discharged into the container.

In some forms, the scale and the motor can be powered by the same power source.

In some forms, the scale can be positioned in the apparatus such that the second container locates thereon during discharge. The scale can be in the form of a ring, wherein the second container is supported by at least two tabs that are positioned on the ring in use.

In some forms, when the scale is positioned laterally adjacent to the second container, the second container can be supported by a collapsing fork arranged to releasably engage the second container.

In a second aspect, an apparatus for discharging ground coffee beans to a container is disclosed. The apparatus may comprise a scale arranged to weigh the discharged beans in the container. The scale means that an accurate quantity of ground coffee beans can be discharged from the apparatus. The scale and apparatus may be otherwise as described above.

In a third aspect, an apparatus for discharging ground coffee beans is disclosed. The apparatus may comprise a first container arranged to dispense coffee beans; a scale; and a grinder arranged to grind the coffee beans dispensed by the first container, the grinder being arranged such that it is able to discharge the ground beans to a second container; wherein the second container is able to be positioned on the scale when receiving the discharged ground beans to thereby weigh the discharged ground beans. Again, use of a scale means that an accurate quantity of ground coffee beans can be discharged from the apparatus. Also, providing the scale within the body of the apparatus allows for the steps of weighing and dispensing to be performed in a single step. The scale and apparatus may be otherwise as described above.

In a forth aspect, an apparatus for discharging ground coffee beans is disclosed. The apparatus may comprise a first container arranged to dispense coffee beans; a grinder arranged to grind the coffee beans dispensed by the first container; and a magnetic coupling arrangement arranged to couple the first container to the apparatus. The magnetic coupling allows for easy removal of the first container from the apparatus. The apparatus may be otherwise as described above.

In a fifth aspect, an apparatus for discharging ground coffee beans is disclosed. The apparatus may comprise a first container arranged to dispense coffee beans; a grinder arranged to grind the coffee beans dispensed by the first container; and a motor arranged to operate the grinder, the motor being positioned above the grinder in use. Positioning the motor above the grinder in use means that a shaft is not required below the grinder and also enables the motor heat to be isolated within the hopper. This allows for coffee beans to be directly dispensed from the grinder to another container located below the grinder. The apparatus may be otherwise as described above.

In a sixth aspect, an apparatus for discharging ground coffee beans is disclosed. The apparatus may comprise a first container arranged to retain and dispense coffee beans; and a grinder arranged to grind the coffee beans dispensed by the first container; wherein the first container has at least one indicia positioned thereat, the indicia able to provide a visual guide to ensure that a correct quantity of coffee beans is retained within the first container in use. This allows for the correct weight of coffee beans to be placed on the grinder in use and ensures a consistent particle size of ground coffee beans is discharged from the grinder. The apparatus may be otherwise as described above.

In a seventh aspect, an apparatus for discharging ground coffee beans including a heat extraction assembly is disclosed. The apparatus may comprise a first container arranged to receive and dispense coffee beans, a body defining an interior chamber and having a grinder disposed therein, the grinder being arranged to grind the coffee beans dispensed by the first container; and a heat extraction assembly for extracting heat from the body, the heat extraction assembly comprising an air inlet in the body that is arranged to direct air into the chamber and onto the grinder, and a fan that is arranged to discharge that air from the body. Advantageously, the heat extraction assembly assists to remove heat generated by the motor and burrs during the grinding process.

In some forms, the air inlet can be arranged such that the air is able to flow past and remove heat from the grinder, and the fan is arranged in the body to discharge the resultant heated air from the body. This arrangement advantageously allows heat to be removed efficiently from the grinder, where a large portion of the heat is produced in the grinding apparatus.

In some forms, the heat extraction assembly can further comprise heat exchange fins disposed radially around and in contact with an external surface of the grinder, the fins able to conduct heat from the grinder. This arrangement further enhances the ability of the heat extraction assembly to remove heat from the grinder.

In some forms, the air inlet can comprise opposing slots located in the body and adjacent to the grinder, the opposing slots allowing ambient air to flow into the chamber from opposite sides of the apparatus. This allows cool ambient air to be directed straight onto the grinder to increase the efficiency of the heat extraction assembly.

In some forms, the heat extraction assembly can further comprise an aperture in an external surface of a grinder support body that is arranged to support and surround the grinder, the aperture enabling air to flow from the chamber to an interior of the grinder support body, whereupon the air can be heated to remove heat from the grinder. This allows cool ambient air to be directed onto the external surface of the grinder to increase the efficiency of heat removal.

In some forms, the fan can be located in the chamber and adjacent to an air outlet disposed in a wall of the body, the fan able to exhaust the heated air through the air outlet.

In some forms, the fan can be controllable to vary its speed to increase or decrease airflow through the chamber.

BRIEF DESCRIPTION OF THE DRAWINGS

Embodiments will now be described by way of example only, with reference to the accompanying drawings in which

FIG. 5 shows another cross sectional view through the coffee grinder shown in FIG. 3;

DETAILED DESCRIPTION

Figure 1:
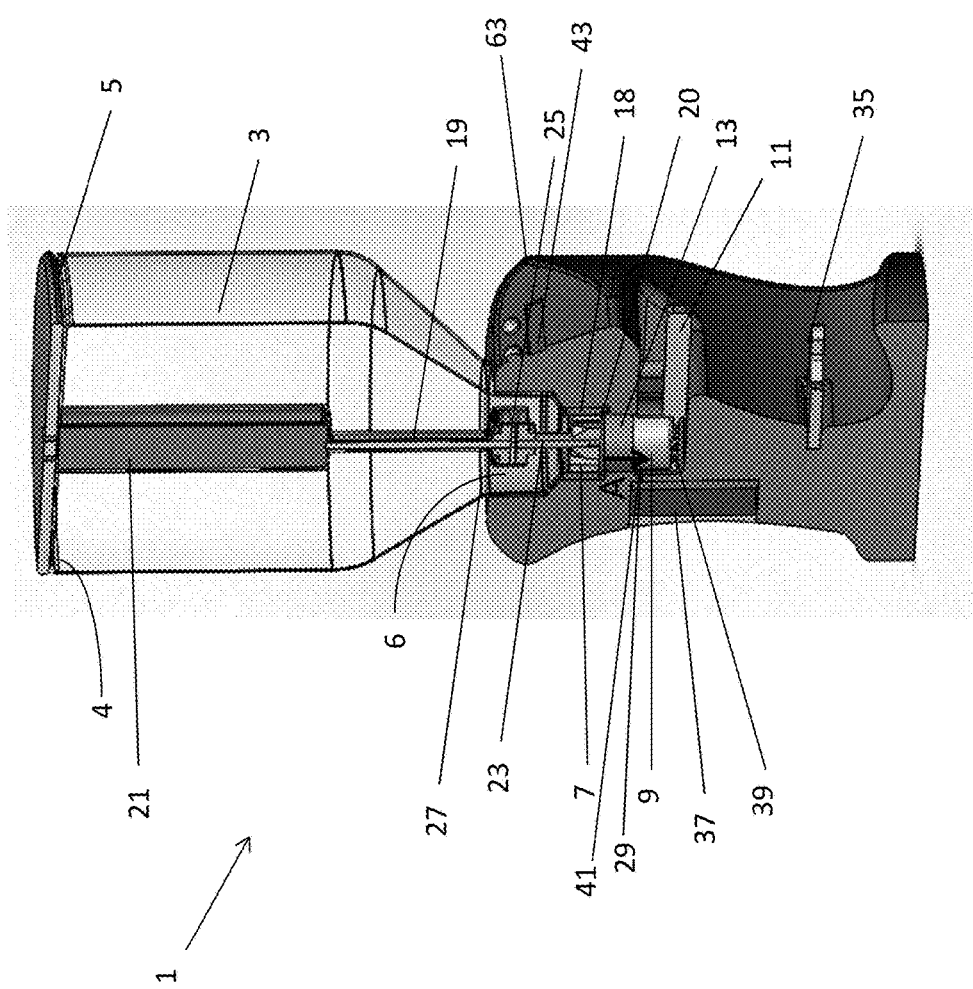
FIG. 1 shows a cross sectional view through an embodiment of the coffee grinder that includes an internal scale.

In the following detailed description, reference is made to accompanying drawings which form a part of the detailed description. The illustrative embodiments described in the detailed description, depicted in the drawings and defined in the claims, are not intended to be limiting. Other embodiments may be utilised and other changes may be made without departing from the spirit or scope of the subject matter presented. It will be readily understood that the aspects of the present disclosure, as generally described herein and illustrated in the drawings can be arranged, substituted, combined, separated and designed in a wide variety of different configurations, all of which are contemplated in this disclosure.

Referring firstly to FIG. 1, an apparatus for discharging ground coffee beans is shown. The apparatus, in the form of a coffee grinder 1, can be used to accurately grind coffee for use in a coffee extraction process. The coffee grinder 1 comprises a first container, in the form of a hopper 3, arranged to receive and dispense coffee beans. The hopper 3 has a lid 5 that is removable to allow for roasted coffee beans to be received within the hopper 3 via a first aperture 4. The coffee grinder 1 further comprises a grinder, in the form of blades 7 and a cassette or a cassette holder 18, arranged to grind the coffee beans dispensed by the hopper 3 via a second aperture 6, the blades 7 being arranged such that it is able to vertically discharge the ground coffee beans, as is indicated by the arrow A. The vertical discharge of coffee beans means that the amount coffee beans retained in the coffee grinder 1 between grinds is significantly reduced or eliminated completely.

Figure 4:
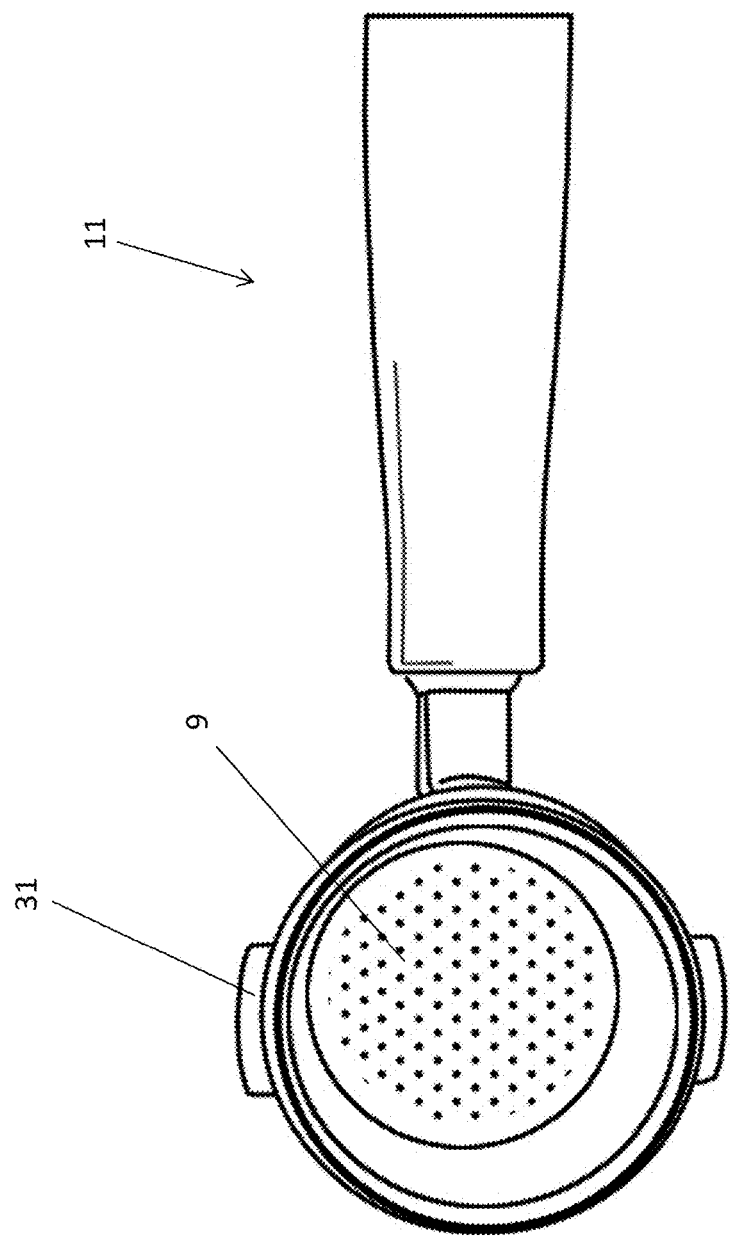
FIG. 4 shows a perspective view of a group head with a portafilter located therein.

The discharged ground coffee beans are received by a second container, in the form of a portafilter 9 that locates in a group handle 11 (see FIG. 4). The group handle 11 and portafilter 9 can be used with known coffee extraction equipment/machines. The portafilter 9 is supported by the coffee grinder 1 at a position whereby the portafilter 9 is able to receive a direct and unrestricted flow of the ground coffee beans. The portafilter 9 is supported vertically below the blades 7.

The coffee grinder 1 further comprises a channel 13, the channel 13 being arranged to receive the ground coffee beans discharged by the blades 7 and deliver the ground coffee beans directly to the portafilter 9. The detailed arrangement allows for the direct discharge of freshly ground coffee beans from the hopper 3, to the blades 7 and subsequently to portafilter 9. As will be further described, this allows for a consistent dosing of freshly ground coffee beans. Advantageously, no obstructions are present between the blades 7 and the portafilter 9, so ground coffee is not retained by the coffee grinder 1. The channel 13 includes a polymer with the appropriate load (% by weight) of an anti-static additive to eliminate static electricity. This polymer is also used to construct the hopper 3.

Figure 2:
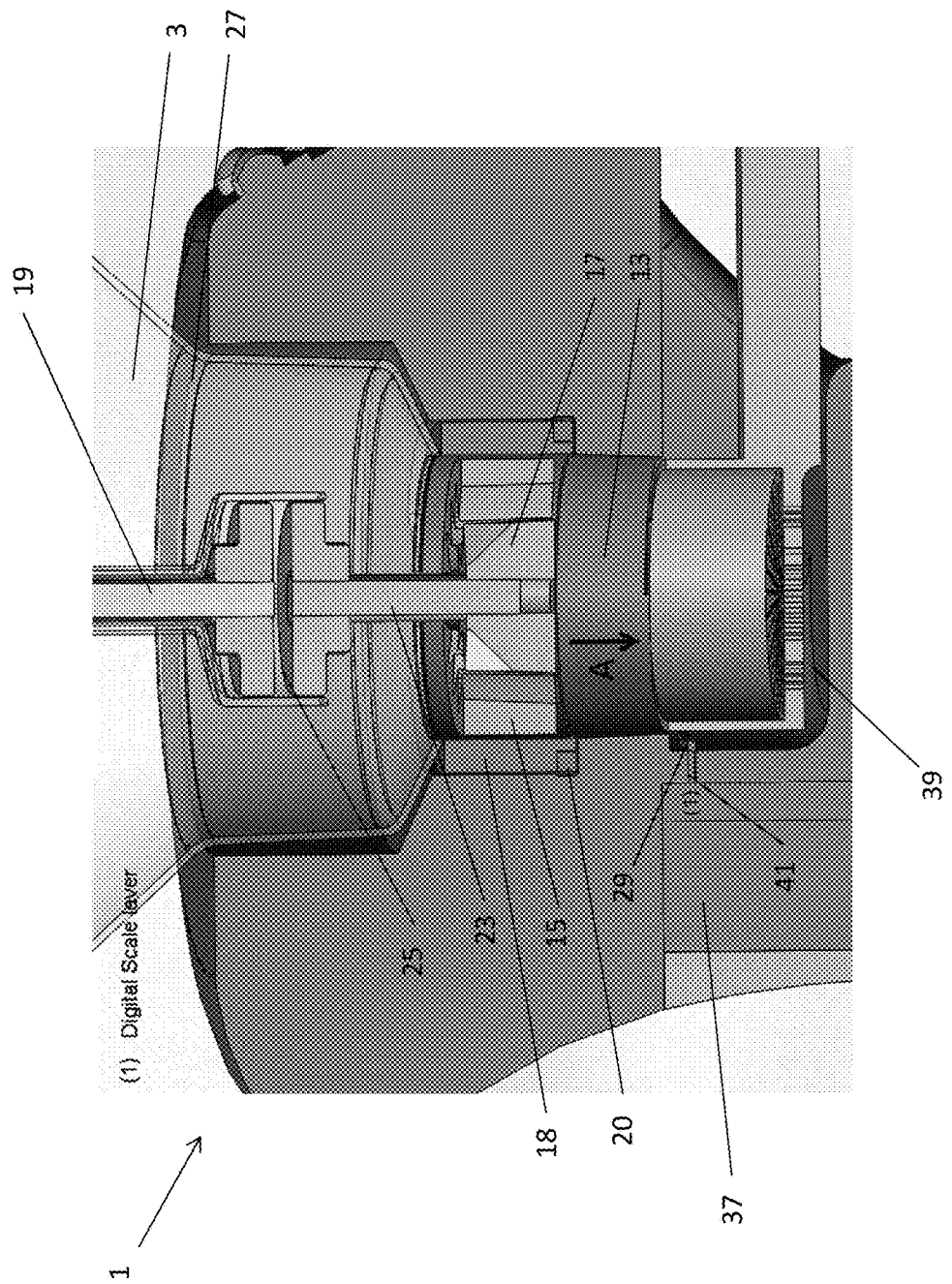
FIG. 2 shows a cross sectional view of the coffee grinder shown in FIG. 1.

Referring now to FIG. 2, the blades 7 will be described in further detail. FIG. 2 shows a cross sectional view of the coffee grinder 1 shown in FIG. 1. The blades 7 comprise a set of conical burr blades, in the form of two burrs 15 and 17, that are rotatable to grind the dispensed coffee beans. In the described embodiment, the conical burrs 15, 17 comprises an outer burr 15 and inner burr 17. In an alternative embodiment (not shown), flat burrs (or any other blade appropriate for grinding roasted coffee beans) can be used in lieu of conical burrs 15, 17. The burrs 15 and 17 are adjustable to vary the distance between them. Adjustment of the burrs 15 and 17 causes the ground coffee beans to vary in fineness. The height adjustment of the outer burr 15 is achieved via a threaded ring (not shown) placed below the cassette holder 18. The ring is turned using a pin (not shown) that is inserted in first slots 20 (FIG. 1) that are placed on the side of the body of the coffee grinder 1. The conical burrs 15, 17 are located within the cassette holder 18. The cassette holder 18 is manufactured in two parts to allow the relative position between the outer burr 15 and the inner burr 17 to be varied. The two part cassette holder 18 permits a quick extraction of the cassette 18 holding the conical burrs 15, 17 from the main body of the coffee grinder 1. Once the cassette 18 is extracted from the body of the coffee grinder 1, the cleaning of the grinder assembly is simple.

Returning to FIG. 1, the coffee grinder 1 further comprises a mechanically powered shaft 23 arranged to rotate the conical burrs 15, 17. The coffee grinder 1 further comprises a motor 21 arranged to rotate a magnetically powered shaft 23. The conical burrs 15, 17 operate between 600 or 700 revolutions/minute. This advantageously minimises heat generation during the grinding process as the blades 7/burrs 15, 17 do no generate a significant amount heat. The motor 21 is a direct current type motor with an integral planetary gearhead and sensor brake operating up to a torque of 30 Nm. The motor 21 is configured such that at start up, it operates for ½ a second at high current, 30 Amp, and then at 5 Amp after start up. This high current utilised at start up overcomes the load created on the conical burrs 15, 17 by the coffee beans.

In the illustrated embodiment, the motor 21 is located within the hopper 3, however, in alternative embodiments the motor 21 can be located outside the hopper 3 or in any other suitable location internal/external of the coffee grinder 1. In the embodiment shown in FIG. 1, a motor shaft 19 is magnetically coupled 25 to the magnetically powered shaft 23, whereby rotation of the motor shaft 19 is translated to the magnetically powered shaft 23 to inturn engage and rotate at least one of the conical burrs 15, 17. The magnetic coupling 25 is disclosed in the form of an electromagnetic docking station. Advantageously, the magnetically coupling 25 is such as to also allow the hopper 3 to be removable from the coffee grinder 1. This connection type allows for effortless removal and insertion of the hopper 3. Furthermore, the power to the motor 21 and the connection with a programmable software module 37 is obtained using the electromagnetic docking system 25. The electromagnetic docking system 25 may also be powered by the same power source that powers the motor 21.

While not shown in the illustrated embodiment, a small groove may be present in the outer wall of the hopper 3. The groove holds a power cable (not shown) for the motor 21 and is capped by a clip-on rigid label (not shown) which can be used to display the trade mark associated with the coffee grinder 1. The power cable connects the motor 21 to the power supply and to the programmable software module 37, located in a base 49 of the coffee grinder 1.

In the illustrated embodiment, the motor 21 is located above the blades 7 in use, within the hopper 3. Having the motor 21 positioned inside the hopper 3 allows for the placement of the vertical channel 13, in the form of a cone, optionally of a non-static material, in the base 49 of the coffee grinder 1. This arrangement allows for the direct discharge of ground coffee beans from the blades 7 to the portafilter 9. Furthermore, roasted whole beans are able to withstand more heat than ground beans without affecting their flavour. As such, it is beneficial to locate the motor 21 away from the freshly ground coffee beans.

When using freshly roasted coffee beans for use in a coffee extraction process such as espresso, it is important to produce an extremely fine grind. To achieve this, the coffee grinder described in the illustrated embodiments allows for the weight of the whole coffee beans to be placed above and directly onto the blades 7. The weight of the coffee beans on the blades 7 affects the fineness of the ground coffee discharged from the grinder 1. To ensure that the appropriate weight of coffee beans is retained in the hopper 3 and therefore onto the blades 7, the hopper 3 has indicia, in the form of markings, on the outside that signify the ideal amount of whole coffee beans that are to be retained within the hopper 3 during grinding. Two markings are present on the outside of the hopper 3, a 'full' marking as well as a 'refill' marking. The consistent weight of beans on the blades 7 assists to achieve a consistent ground coffee particle size. In some circumstances, if there is not enough weight on the blades 7 of the grinder 1, the beans bounce off the blades 7 into the hopper 3, which results in an inconsistent dosage of ground coffee beans.

The coffee grinder 1 further comprises a slidable gate 27 (also shown in FIG. 10) between the hopper 3 and the blades 7. The slidable gate 27 is operable to allow the hopper 3 to dispense the coffee beans. The slidable gate 27 is actuated manually via a lever placed on the outside of the coffee grinder 1. The slidable gate 27 is open when the coffee grinder 1 is operational (i.e. grinding coffee beans).

When extracting coffee, the extracted liquid should begin to flow from the group head after about seven seconds (from the moment the extraction is started). If this takes longer than ten seconds, the extraction is referred to as a false extraction. If it is faster than seven seconds, it indicates that the grind is too coarse or that the dose is too low. When liquid begins to be extracted from the portafiler it initially drips, before the drips become more constant and finally form into continuous flow. The time between the start of extraction, the formation of drips and the formation of a continuous flow are dependent on the quantity of coffee in the filter. To achieve a perfect and consistent flavour of coffee, the time between these events should be consistent for each separate extraction. A tenth of a gram difference in the quantity of ground coffee affects the extraction process and therefore the flavour of the extracted beverage.

Figure 3:
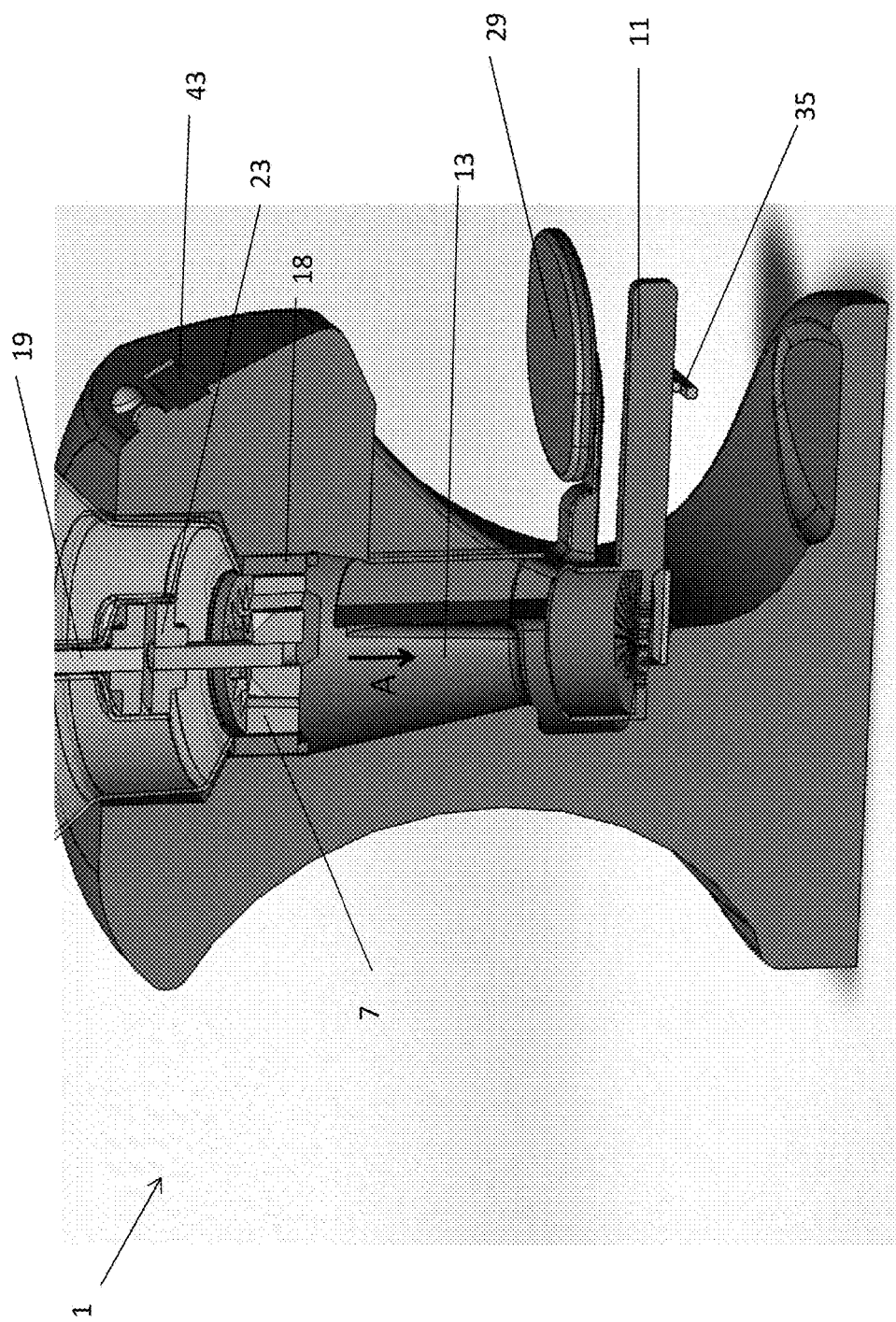
FIG. 3 shows a cross sectional view through an embodiment of the coffee grinder that includes an external scale.

To help ensure a consistent coffee extraction process, the coffee grinder 1 comprises a scale 29 arranged to weigh the discharged beans in the portafilter 9. The scale 29 is positioned in the coffee grinder 1 adjacent to where the beans are discharged into the portafilter 9, whereby the beans discharged into the portafilter 9 are able to be weighed immediately following discharge. The scale 29 is positioned in the coffee grinder 1 such that the portafilter 9 is located on the scale 29 as the beans are discharged into the portafilter 9. Alternatively, as shown in FIGS. 3 and 5, the scale 29 is positioned laterally adjacent to the portafilter 9 when the beans are being discharged into the portafilter 9. In an alternate embodiment not shown in the drawings, the scale 29 is positioned in the group handle 11 either under the outer peripheral lip of the portafilter 9 or suspended internally of the group handle 11.

The scale 29 and the motor 21 are powered by the same power source. The coffee grinder 1 is powered by mains power. When the scale 29 is positioned in the coffee grinder 1 such that the portafilter 9 locates thereon during discharge, the scale 29 is in the form of a ring, wherein portafilter 9 is supported by at least two tabs 31 that are positioned on the scale 29 in use. Referring now to FIG. 4, the tabs 31 are described in further detail. The tabs 31 are located on the outer diameter of the group handle 11 and are typically used to engage and retain the group handle 11 on the coffee grinder 1 during the coffee extraction process.

Referring again to FIGS. 1 and 2, the connection between the portafilter 9 and the coffee grinder 1 is described in further detail. A passage 39 in the body of the coffee grinder 1 allows for the group handle 11 and portafilter 9, located thereon, to be inserted into the coffee grinder 1 and onto the scale 29. The scale 29 connects directly to a digital scale 41. The weight of the ground coffee discharged into the portafilter 9 is displayed on a digital read out window 43 at the front of the coffee grinder 1. In this embodiment, a collapsing fork 35 is located at the base 49 of the coffee grinder 1 (as shown in FIG. 1). Referring again to FIG. 3 and FIG. 5, when the external scale 29 is positioned laterally adjacent to the portafilter 9, the group handle 11 is supported by a collapsing fork 35 arranged to releasably hold/engage the group handle 11.

The programmable software module 37 allows for a timed grind. The vertical non-static conical channel 13 between the blades 7 and the portafilter 9 ensures that the timed ground produces an accurate quantity (dose) of freshly ground coffee. This arrangement prevents ground coffee from being retained within the coffee grinder 1, therefore meaning that there is not a requirement to purge the coffee grinder 1 between doses, resulting in less to no wastage of coffee beans. When the scale 29 and vertical non-static conical channel 13 are used in combination, this allows for the dose to be weighed by the user to confirm that the quantity of freshly ground coffee beans is accurate. If it is not accurate, the user can manually adjust the quantity of coffee in the portafilter 9. Alternatively, the user can calibrate the quantity of ground coffee discharged from the blades 7 by adjusting the grind time.

In another embodiment, the programmable software module 37 allows for the scale 29 and the motor 21 to communicate with one another. For example, the scale 29 and the motor 21 can be connected using closed-loop feedback control such that the motor 21 stops when the scale 29 reads a programmed quantity of coffee. In another embodiment, the user can manually control the coffee grinder 1, ceasing the grinding process when the digital read out window 43 displays the quantity of freshly ground coffee beans desired.

The programmable software module 37 has a programmable tare function, allowing the user to program each group head separately. This allows a barista to alternate between multiple blends (including single origin) coffee beans as well as taking into account the differences in group head and portafilter weight.

Another embodiment will now be described with reference to FIGS. 6 to 17. In this embodiment, the coffee grinder 1 includes a heat extraction assembly. The heat extraction assembly assists to remove heat generated by the motor and burrs during the grinding process. The generated heat can burn and dramatically speed up the ageing of the ground coffee due to the Maillard reaction, thereby releasing excess amounts of carbon dioxide which causes the ground coffee to clump and stick to surfaces in the coffee grinder 1. This can also change the structure and flavour/aroma of the ground coffee. The heat extraction system described below assists to transfer heat from within the coffee grinder 1 to the outside environment.

Figure 6:
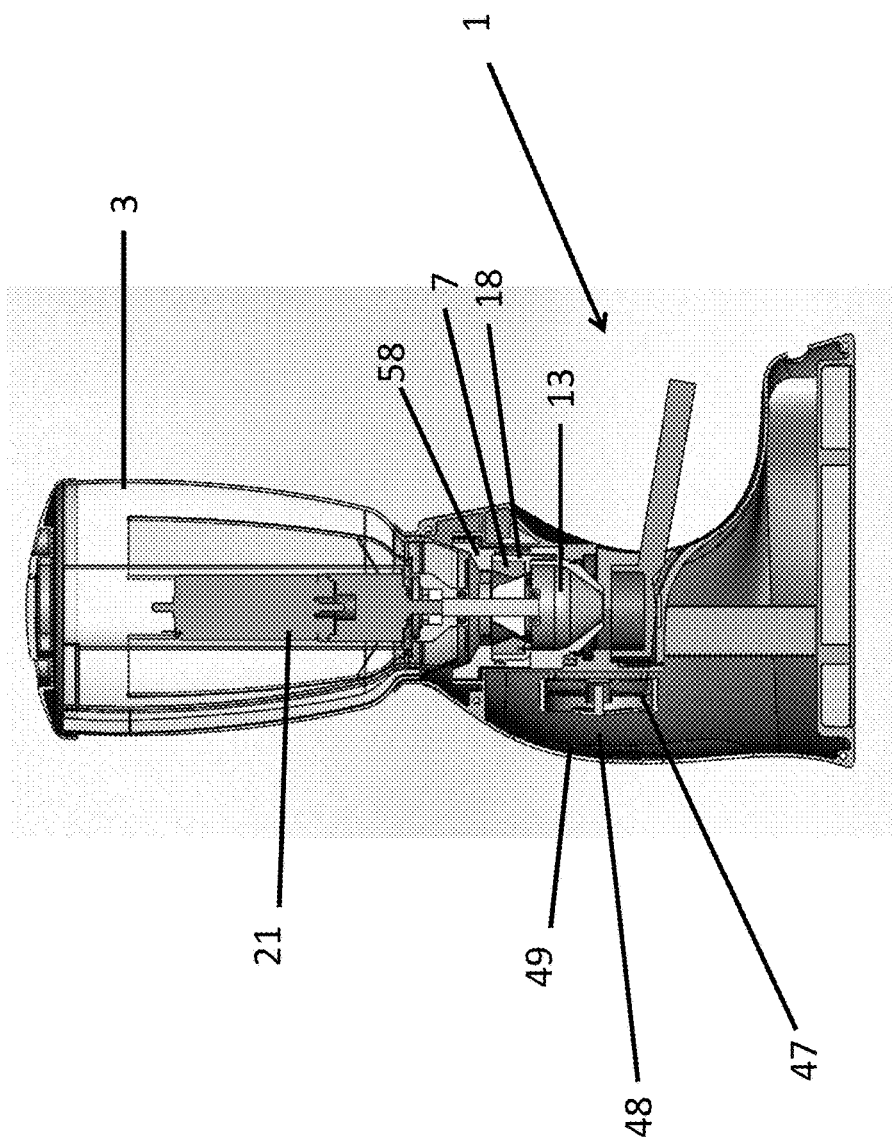
FIG. 6 shows a cross sectional view through an embodiment of the coffee grinder including a heat extraction assembly.
Figure 7:
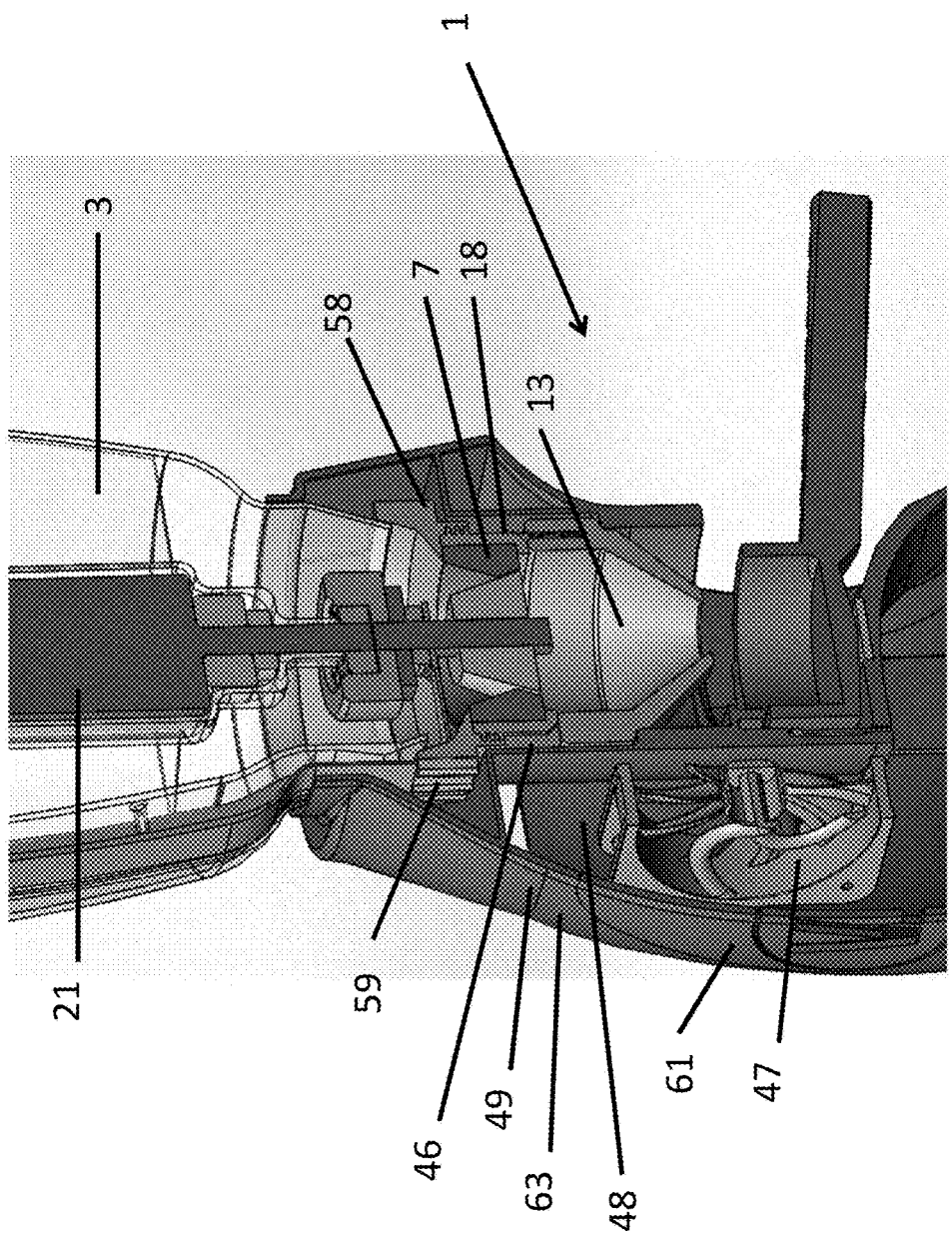
FIG. 7 shows a cross sectional view through the coffee grinder shown in FIG. 6.
Figure 8:
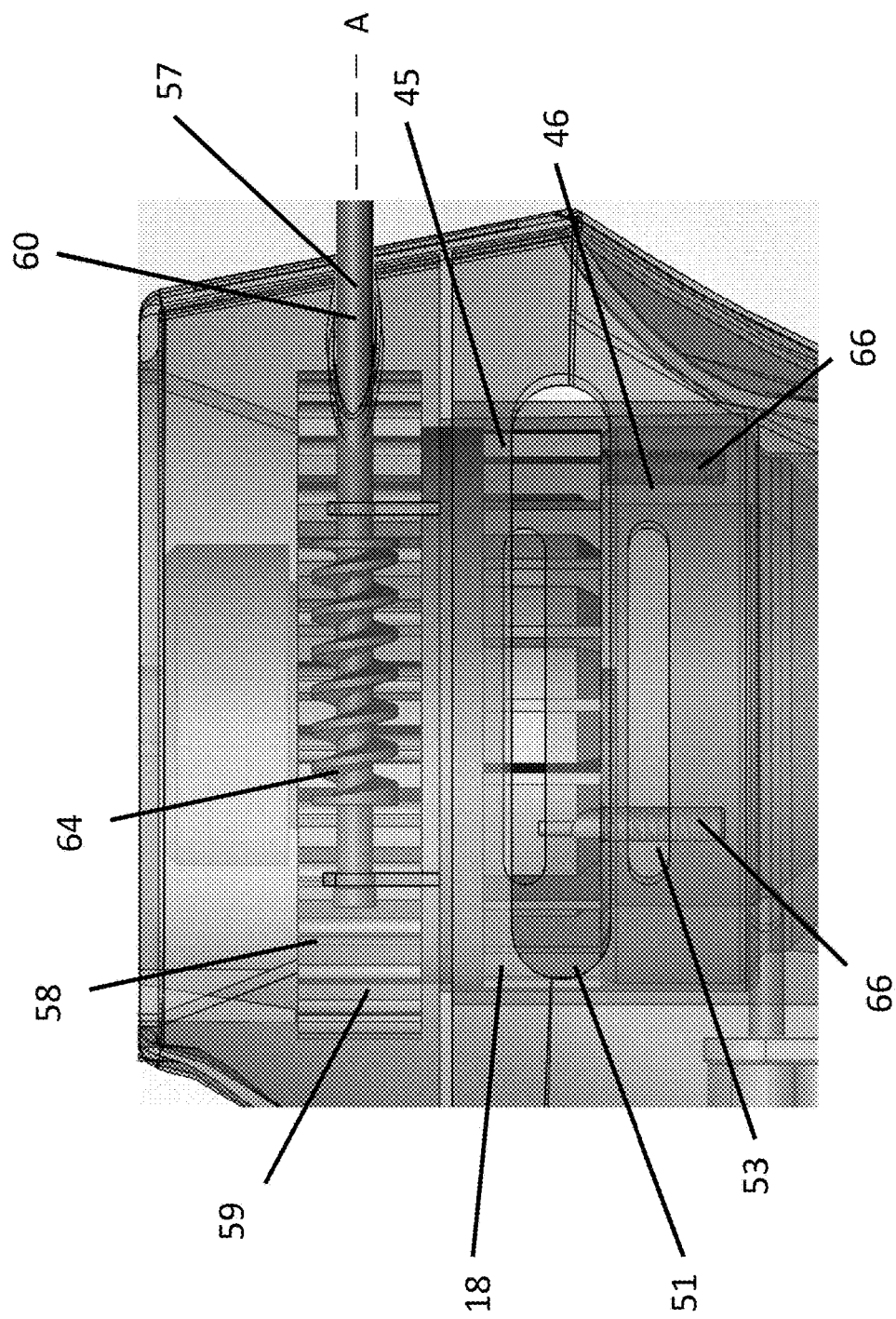
FIG. 8 shows a view through the base of the coffee grinder shown in FIG. 6 showing the ventilation openings adjacent the grinder.
Figure 9:
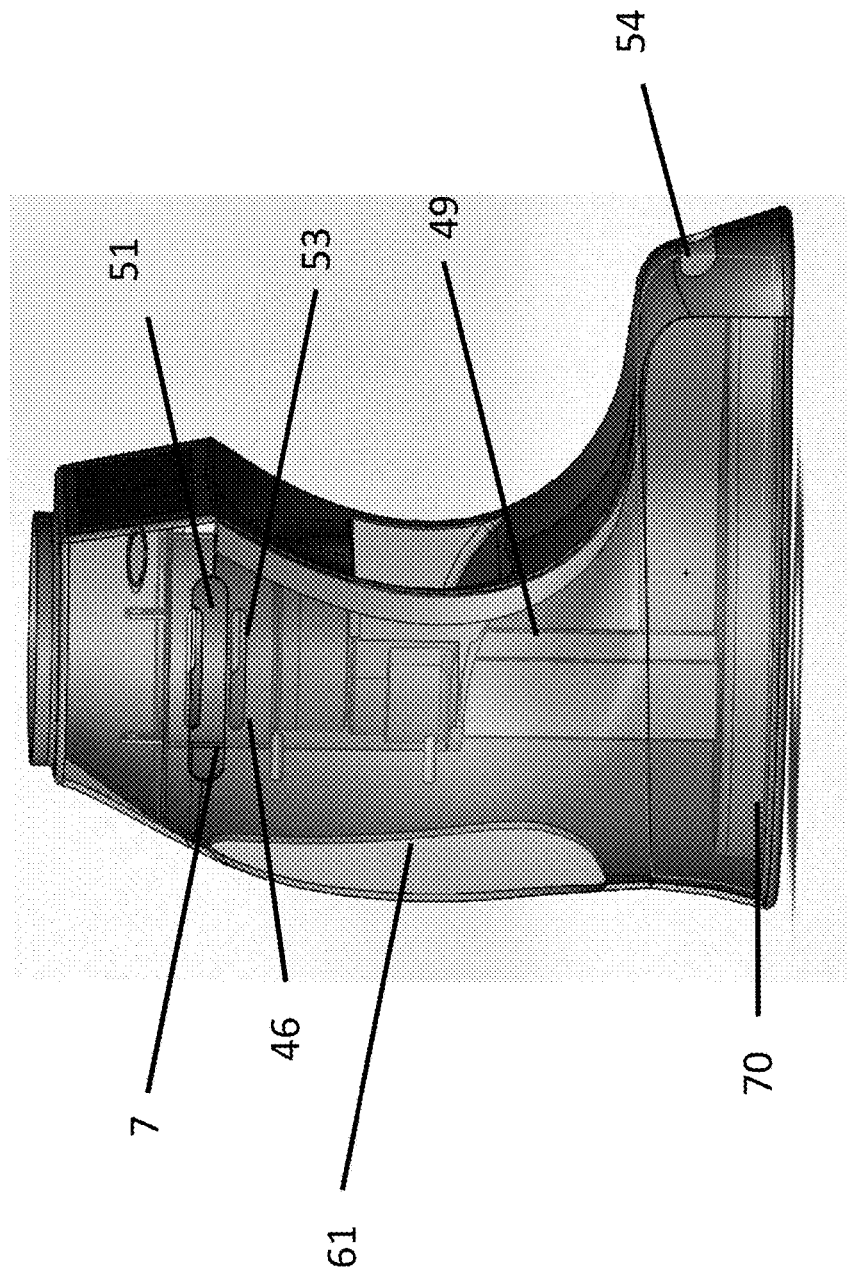
FIG. 9 shows a side view through the base of the coffee grinder shown in FIG. 6.

FIGS. 6 and 7 show cross sections through the embodiment of coffee grinder 1 that includes a heat extraction system. The coffee grinder 1 comprises a hopper 3 arranged to receive and dispense coffee beans. The coffee grinder 1 also has a body, in the form of the base 49, defining an interior chamber 48. The coffee grinder 1 includes a grinder, again in the form of blades 7 and a cassette or cassette holder 18. The blades 7 are arranged to grind the coffee beans dispensed by the hopper 3. As shown in FIGS. 8 and 9, the coffee grinder 1 also comprises a heat extraction assembly for extracting heat from the body, the heat extraction assembly comprising an air inlet 51, in the form of a ventilation opening, in the body 49 that is arranged to direct air into the chamber 48 and directly onto the cassette 18 that houses the blades 7, and a fan 47 that is arranged to discharge that air from the base 49.

The air inlet 51 is arranged such that the air is able to flow past and remove heat from the cassette 18, and the fan 47 is arranged in the base 49 to discharge the resultant heated air from the base 49. The heat extraction assembly further comprises heat exchange fins 45 disposed radially around and in contact with an external surface 50 of the cassette 18, the fins 45 able to conduct heat from the cassette 18. The fins 45 are located about the periphery of the cassette holder 18. Heat, resulting from the grinding process, passes by conduction from the cassette 18 to the fins 45 and is extracted from the base 49 by forcing air through the base 49. Advantageously, the fins 45 provide more cooling area and aid in directing air flow. The cassette 18 housing the blades 7 is supported by a grinder support body 46, in the form of a cassette support, which forms a support body that surrounds the cassette 18 and the blades 7.

The air inlet 51 comprises a pair of opposing slots, in the form of ventilation openings 51, located in the base 49 and adjacent to the blades 7, the opposing slots 51 allowing ambient air to flow into the chamber 48 from opposite sides of the coffee grinder 1 and directly onto the cassette 18 that houses the blades 7.

The heat extraction assembly further comprises at least one aperture 53 in an external surface of the cassette support 46 to enable air to flow from the chamber 48 to an interior of the cassette support 46 and onto the cassette holder 18, whereupon the air can be heated to remove heat from the blades 7 and the cassette 18. During operation, the fan 47 installed at the lower rear end of the grinder 1 continuously pulls the air from the inside of the coffee grinder body 49 at speed and discharges it to the outside at the rear of the coffee grinder 1. The incoming fresh air, from the surrounding environment, enters the inside of the coffee grinder body 49 via the air inlet 51 placed on the two sides of the body on the upper end and optionally at a lower front port 54 (FIG. 9) of the body 49. The inner section of the body 49 that supports a gear system, the conical burr magazine (the cassette holder 18), the conical coffee discharge (vertical non-static cone/channel 13), the coffee filter and the scale 29 may all have air intakes to ensure an adequate air circulation around the blades 7 is achieved.

The fan 47 is located in the chamber 48 and adjacent to an air outlet 61 disposed in a wall 63 of the base 49, the fan 47 able to exhaust the heated air through the air outlet 61. Air outlet 61 and air inlet 51 are in the form of colourful removable grills that can be alternated to change the appearance of the apparatus. The area of the apertures through the grill 61, and therefore the pressure drop produced by the grill 61, can be sized to suit the fans capabilities to ensure that hot air is expelled quickly from the inner body of the coffee grinder 1. The fan 47 is controllable to vary its speed to increase or decrease airflow through the chamber 48. Controlling the air flow and the shape of the fins achieves efficient cooling of the coffee grinder 1.

Locating the motor 21 in the hopper 3 allows for the heat extraction assembly to be directed towards extracting heat directly from the grinder 1 in the base 49. It also allows for the air inlet 51 to be adjacent the cassette 18 that houses the blades 7 such that ambient air can be directed straight onto the cassette 18 that houses the blades 7 before being exhausted from the base 49.

In an alternate embodiment not detailed in the drawings, the cassette holder 18 is to be water cooled, using a pump system in lieu of the fan 47 and a piping system that directs cooling water through the cassette 18. In one embodiment, the pump that forms part of a coffee extraction machine operates as the water pump for the grinder body 49.

Figure 10:
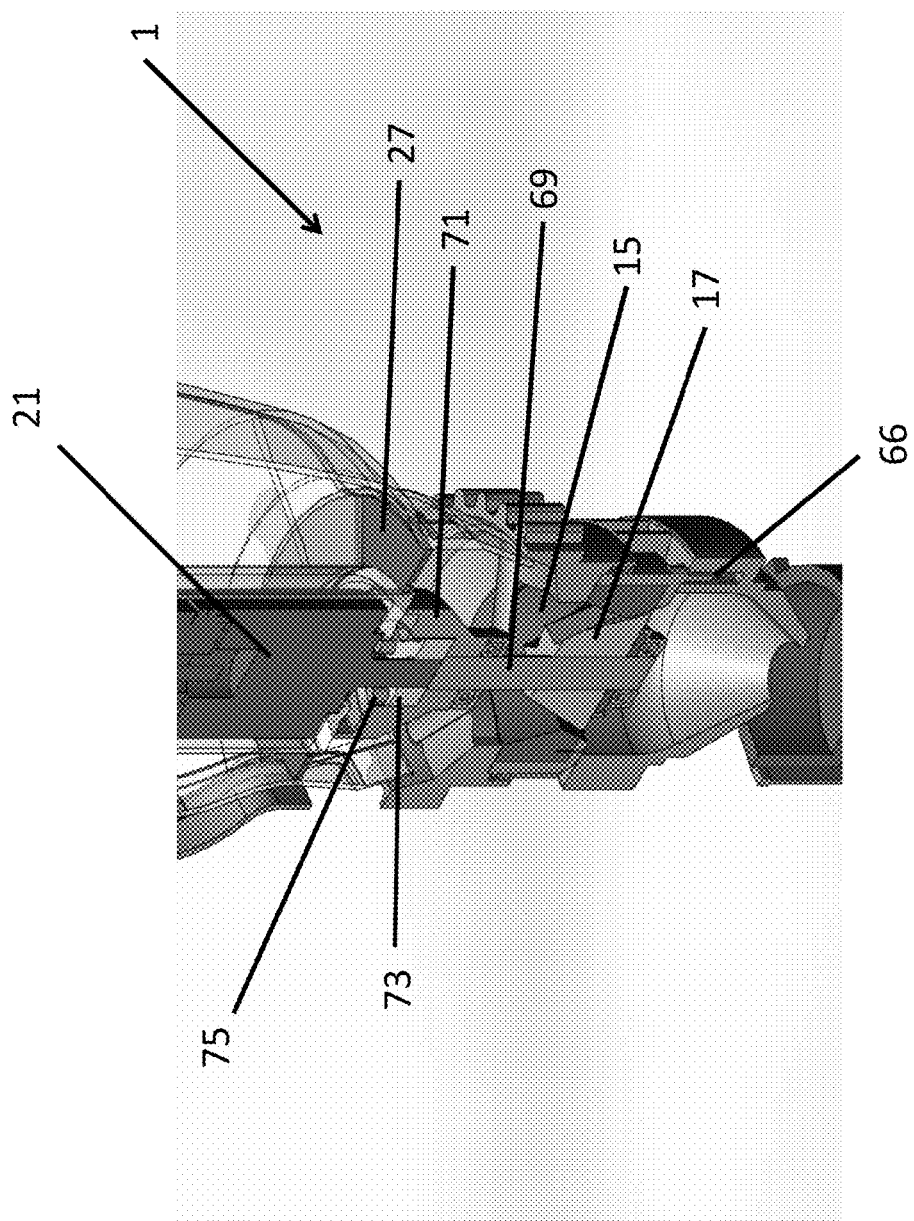
FIG. 10 shows an enlarged view of the grinder and connected internal mechanisms of the coffee grinder shown in FIG. 6.
Figure 11:
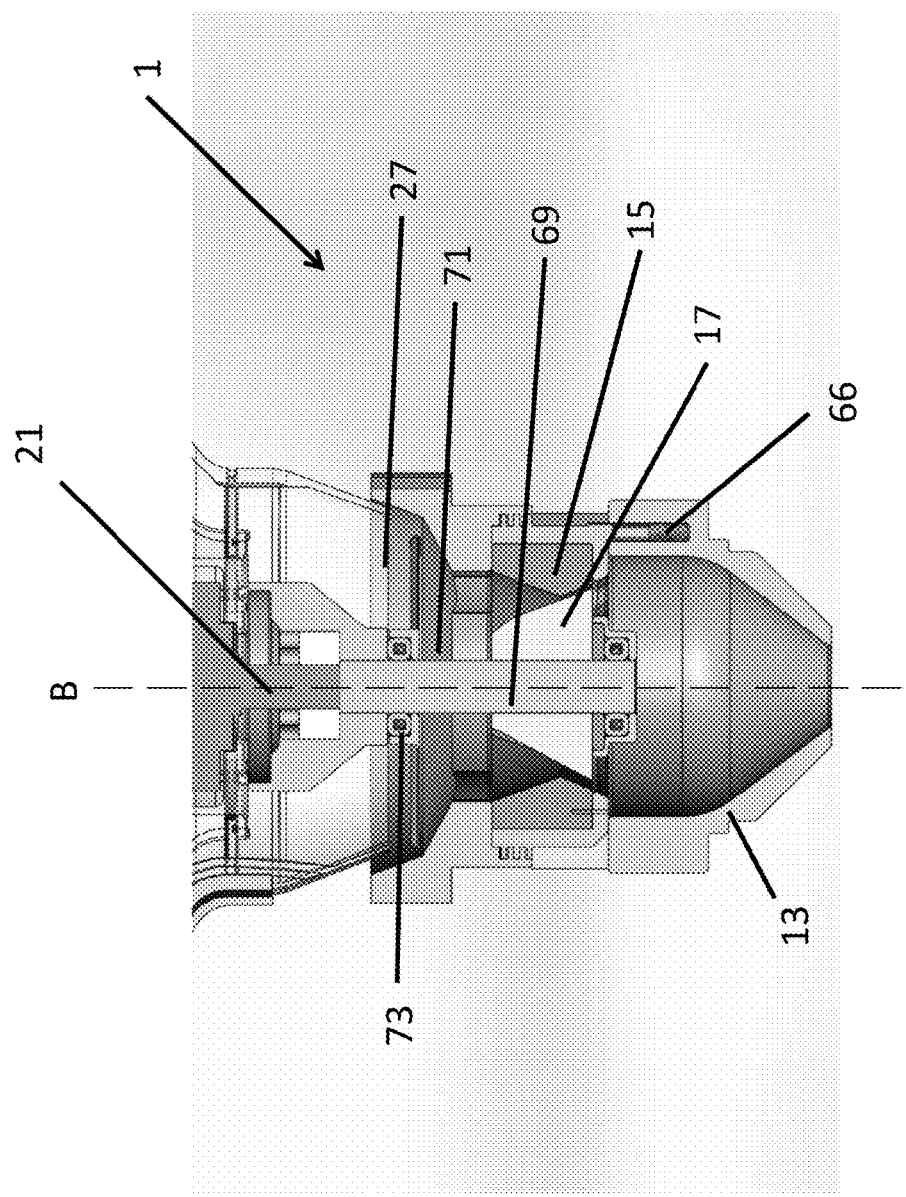
FIG. 11 shows another enlarged view of the grinder and connected internal mechanisms of the coffee grinder shown in FIG. 6.

Another embodiment will now be described with reference to FIGS. 10 and 11. The coffee grinder 1 includes a mechanical coupling system 65. The shaft 19 of the motor 21 is mechanically coupled 65 to a mechanically powered shaft 69, whereby rotation of the motor shaft 19 is translated to the mechanically powered shaft 69 to inturn engage and rotate at least one of the conical burrs 15, 17. The mechanical coupling 65 is such as to also allow the first container 3 to be removable from the apparatus. The mechanical coupling 65 comprises a female portion 71 mounted to the mechanically powered shaft 69 that receives a male portion 73 mounted to the motor shaft 19, the male 73 and female 71 portions having co-operating teeth 75 that engage to rotate the burrs 15, 17 upon rotation of the motor shaft 19. The hopper 3, the motor 21, the motor shafts 19, 69, the burrs 15, 17, and the cone-shaped channel 13 are axially aligned along the longitudinal axis (B) of the grinder 1. This allows for the direct discharge of ground coffee beans from the hopper 3 to the portafilter 9.

Figure 12:
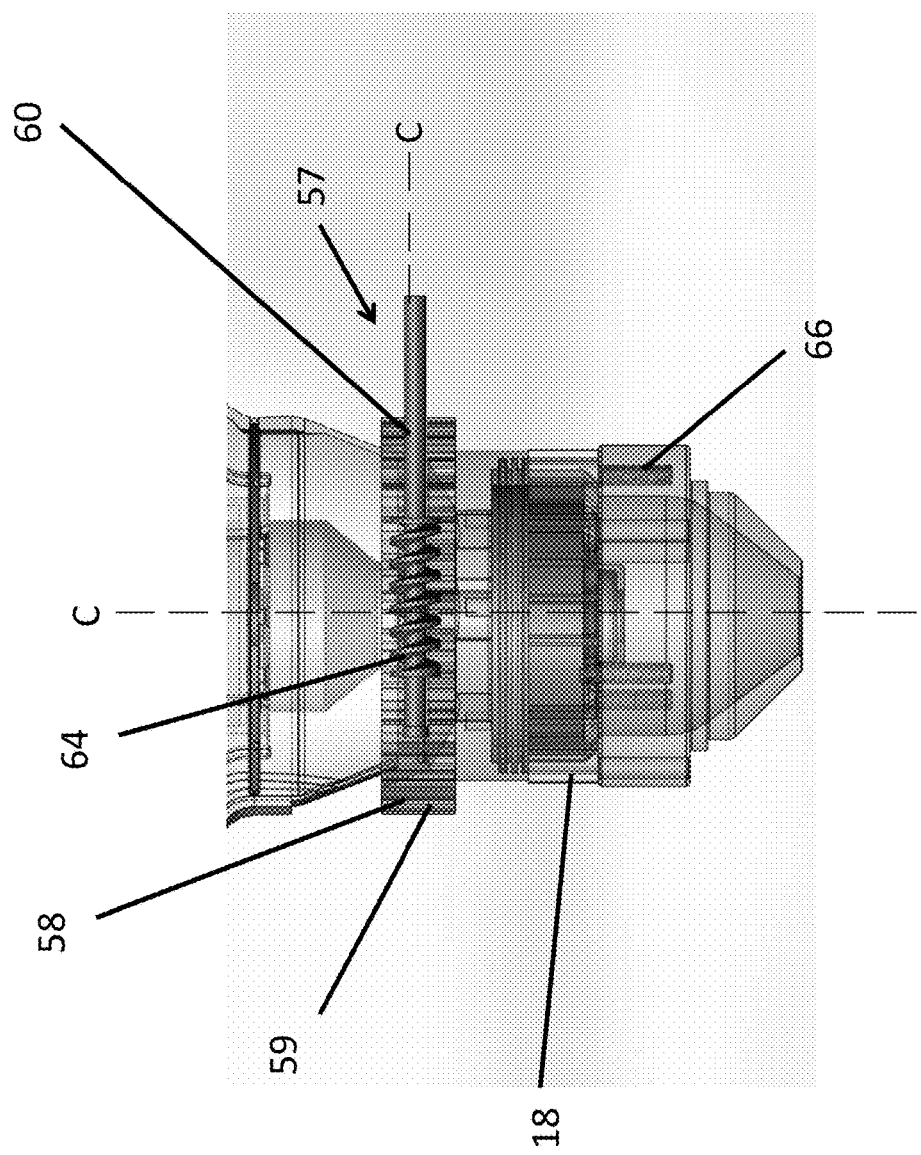
FIG. 12 shows a side view of a worm gear assembly for fine adjustment of the grinder.
Figure 13:
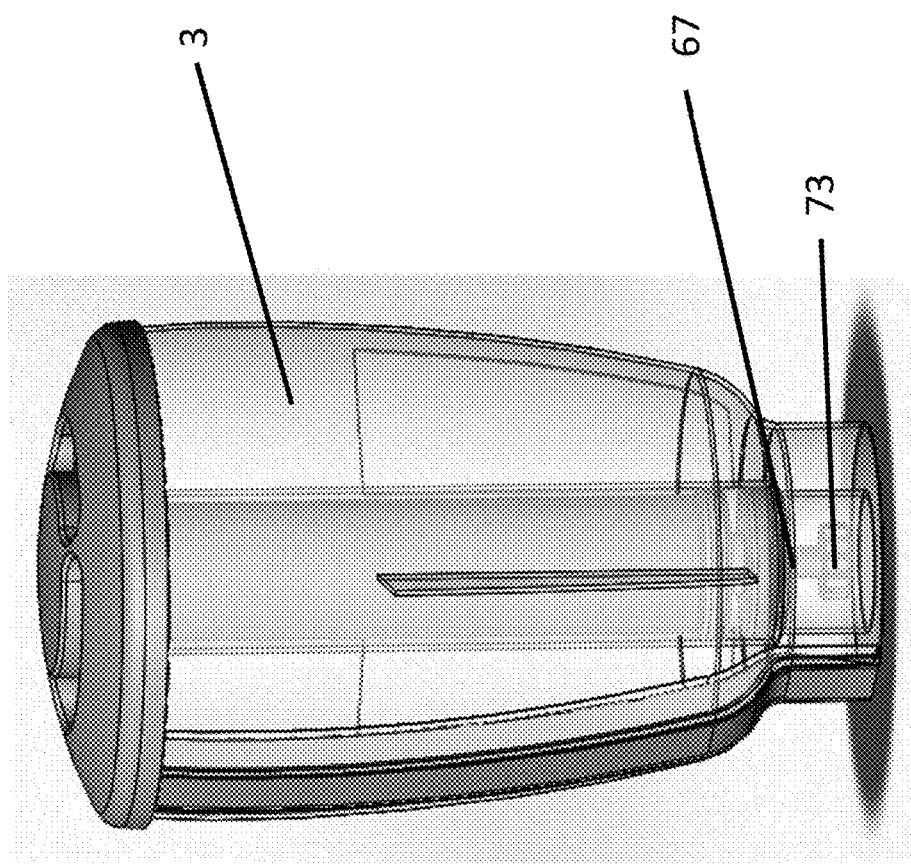
FIG. 13 shows a side view through the hopper with the lid and motor fitted.
Figure 14:
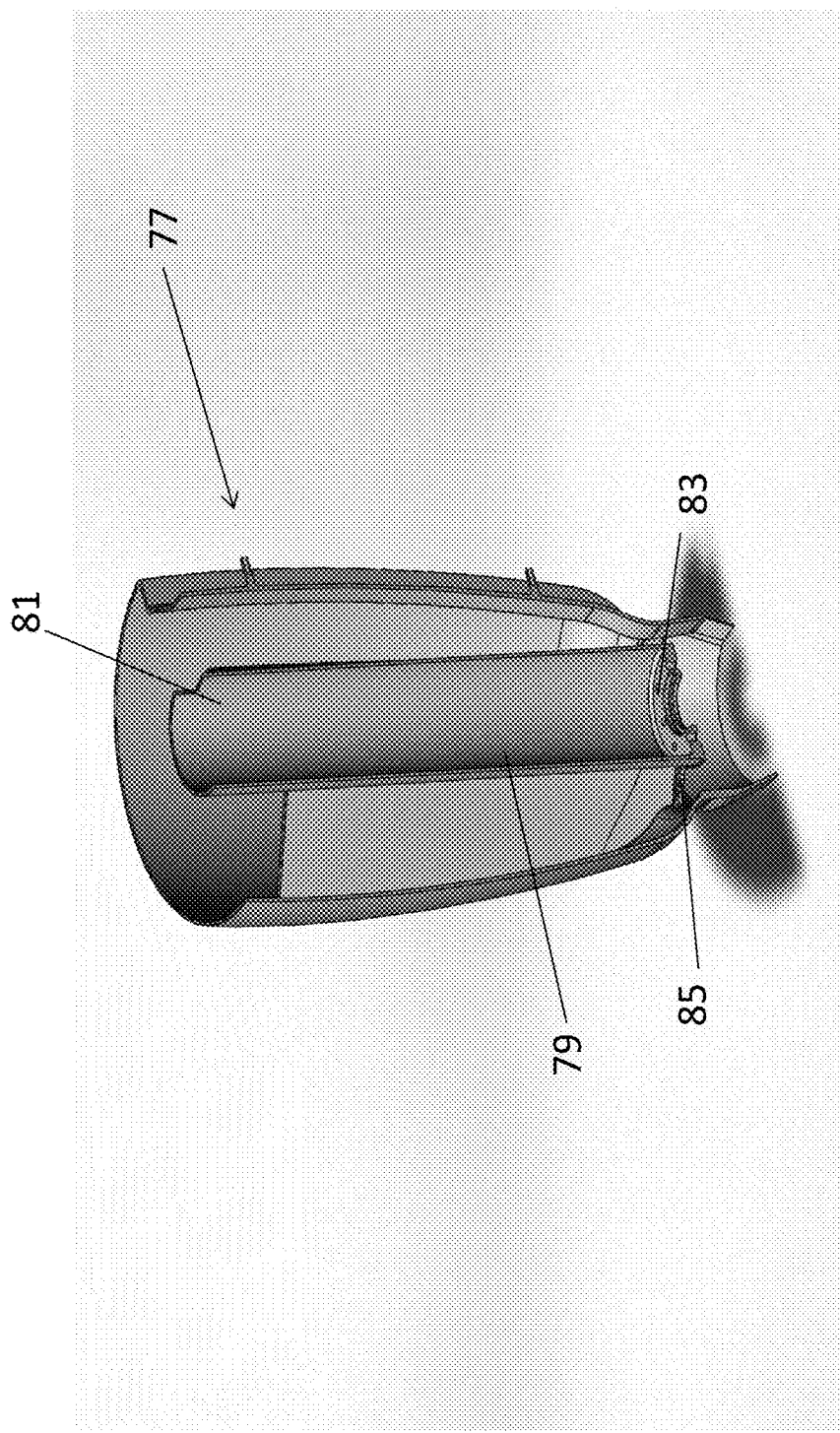
FIG. 14 shows a cross sectional view through the hopper shown in FIG. 13.
Figure 15:
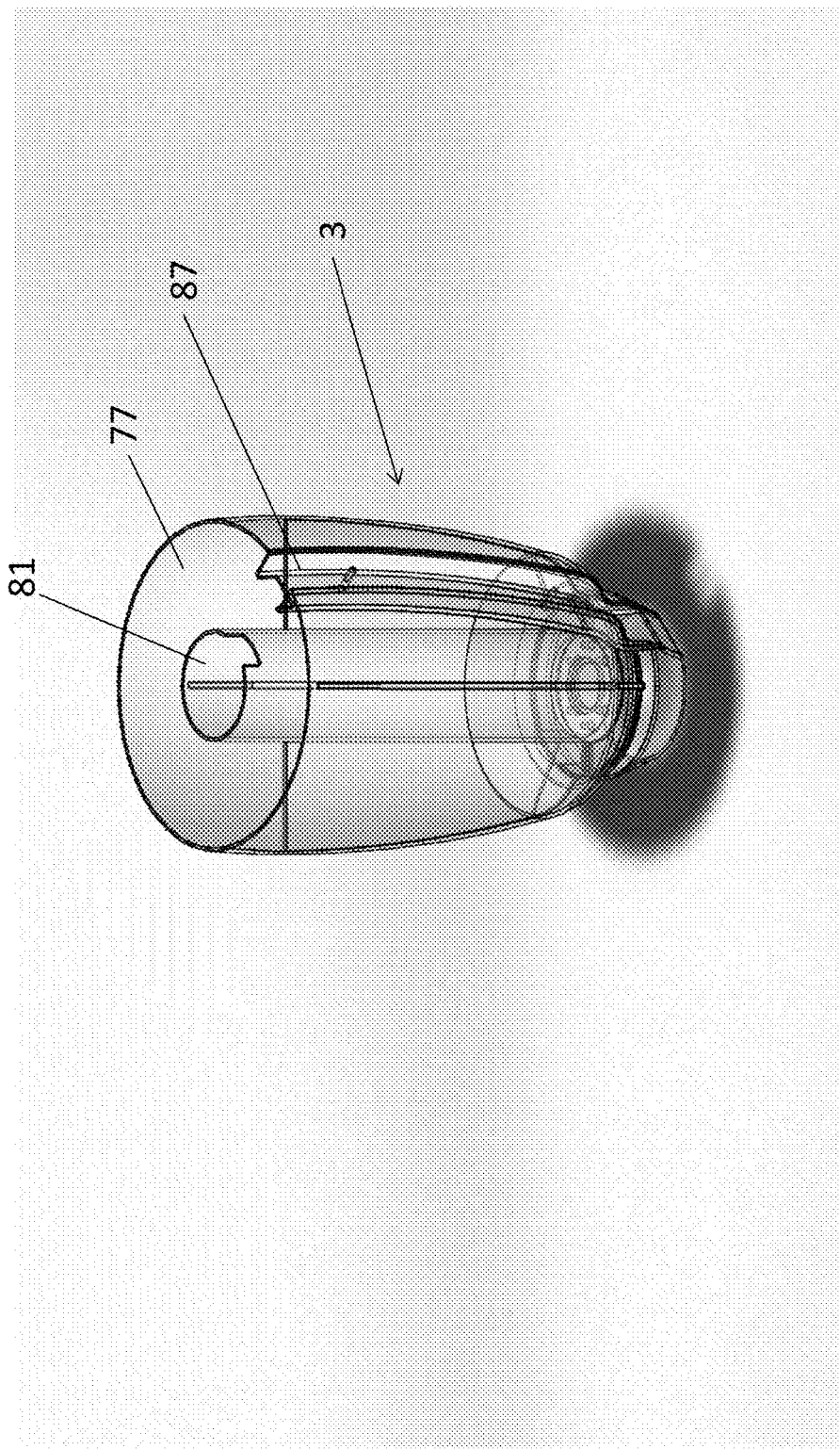
FIG. 15 shows a perspective view of the hopper shown in FIG. 13 with the cover removed.

FIG. 12 shows an embodiment of the coffee grinder 1 that includes a worm gear assembly 57. The worm gear assembly 57 allows for a micrometric adjustment of the conical burrs 15, 17. This allows for fine adjustment of the conical burrs 15, 17 which allows a user to vary the size of the ground coffee beans. The worm gear assembly 57 comprises an elongate threaded stem 60 that protrudes from the grinder 1 such that a user can manually rotate the stem 60 to cause the distance between the burrs 15, 17 to vary. The worm gear assembly 57 further comprises teeth 59 disposed about a periphery of a component, in the form of gear 58, the teeth 59 being arranged to co-operate with the threads 64 of the elongate stem 60, which engagement causes the gear 58 to in turn act on the conical burrs 15, 17 to vary the distance between the two burrs 15, 17 when the elongate stem 60 is rotated. The gear 58 rotates when a user turns the worm gear assembly 57 clockwise or anti clockwise. The gear system 57 engages with the cassette holder 18 via a spring 66 located at the lower end of the gear assembly 57. Once the stem 60 is rotated clockwise or anti clockwise the spring 66 is compressed or expanded to lower or raise the cassette holder 18. This makes it possible for the user to alter the sizes of the grind. In this embodiment, the threads 64 project radially from the elongate stem 60 and are perpendicular to the longitudinal axis (C) of the elongate stem 60. The longitudinal axis (C) is substantially perpendicular to the longitudinal axis B of the grinder 1. The teeth 59 are cut into the outer surface of the cassette holder 18 and are substantially perpendicular to the longitudinal axis A of the elongate stem 60.

In one embodiment, the base 49 of the grinder 1 is to be manufactured in two halves, like a shell, to allow the assembly of all the components, including the power source, the programmable software module 37, heat extraction fan 47 and a weight 70 (see FIG. 9) located at the bottom of the base 49.

Figure 16:
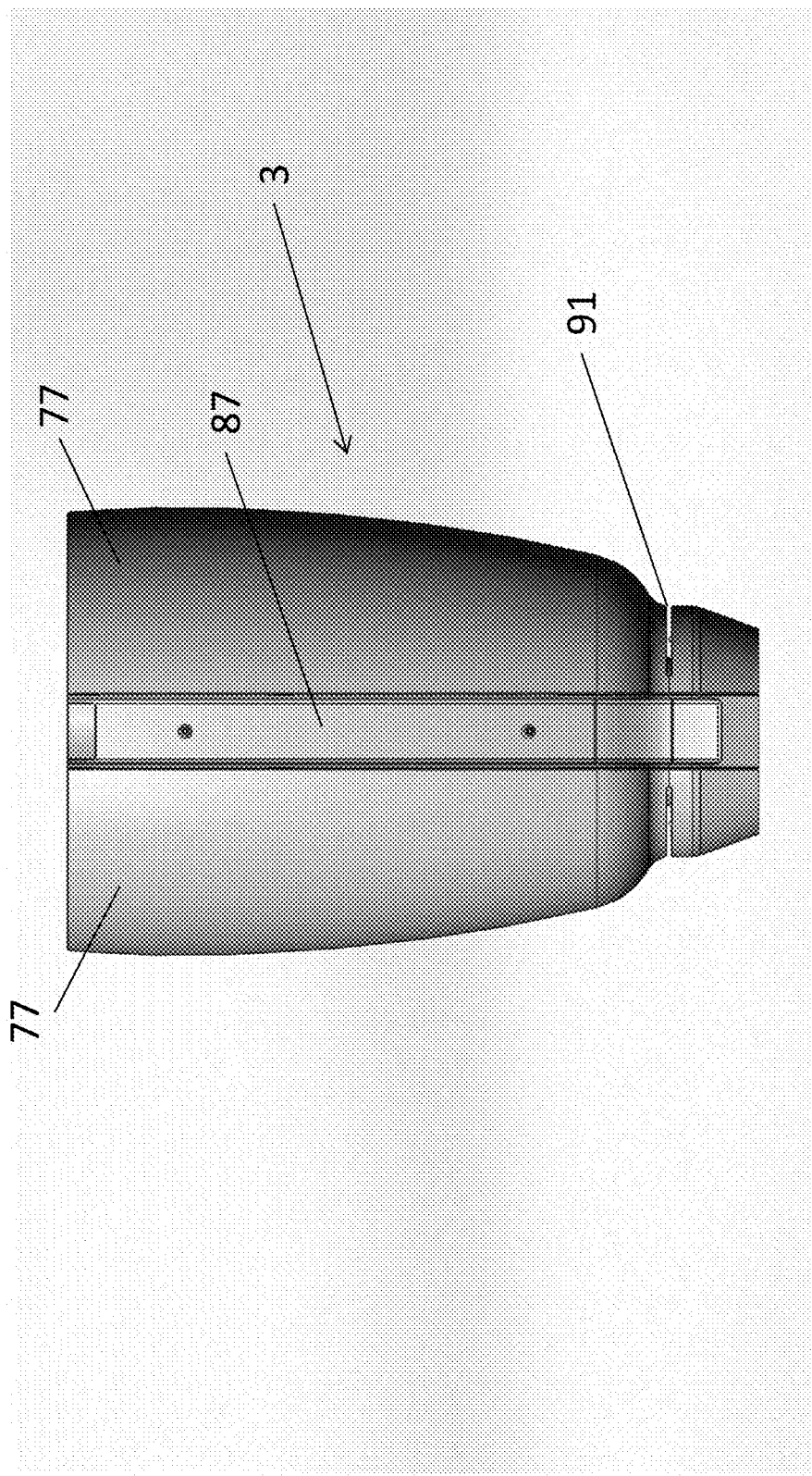
FIG. 16 shows another side view of the hopper shown in FIG. 13 with the cover included.

In an embodiment shown in FIGS. 13 to 16, the hopper 3 is formed from a single body, in the form of casing 77. In an alternate embodiment, the hopper 3 can be formed from two casings that are mirror images of one another and clip together to form a single body. In the illustrated embodiment, the casing 77 of the hopper 3 includes a motor support portion, in the form of motor receptacle 79, that forms a motor support cylinder 81 to support the motor 21 within the hopper 3. The motor support cylinder 81 separates the motor 21 from the coffee beans stored within the hopper 3. This enables the heat generated by the motor to be separated from the coffee beans contained within the hopper 3, thus inhibiting or preventing the beans from being heated prior to being ground. The motor receptacle 79 includes a projecting portion that forms a collar 83 at the end proximal to the grinder (burrs 15, 17) to support the weight of the motor 21. The motor 21 can be mechanically fastened to the collar 83 to inhibit the motor 21 from vibrating within the hopper 3. Support struts 85 extend between the outer shell of the hopper 3 and the motor receptacle 79 to support the cylinder 81 within the hopper 3. The hopper 3 includes a recess 87 in its outer wall. In this embodiment, the power source, programmable software module 37 and associated wiring can be contained within the recess 87 of the hopper 3. As shown in FIG. 16, a cover 89 can be clipped over the recess 87 to hide the components contained within the recess 87. The hopper 3 also includes a second slot 91 that is configured to receive the slidable gate 27 that allows for coffee beans to be released from the hopper 3.

Figure 17:
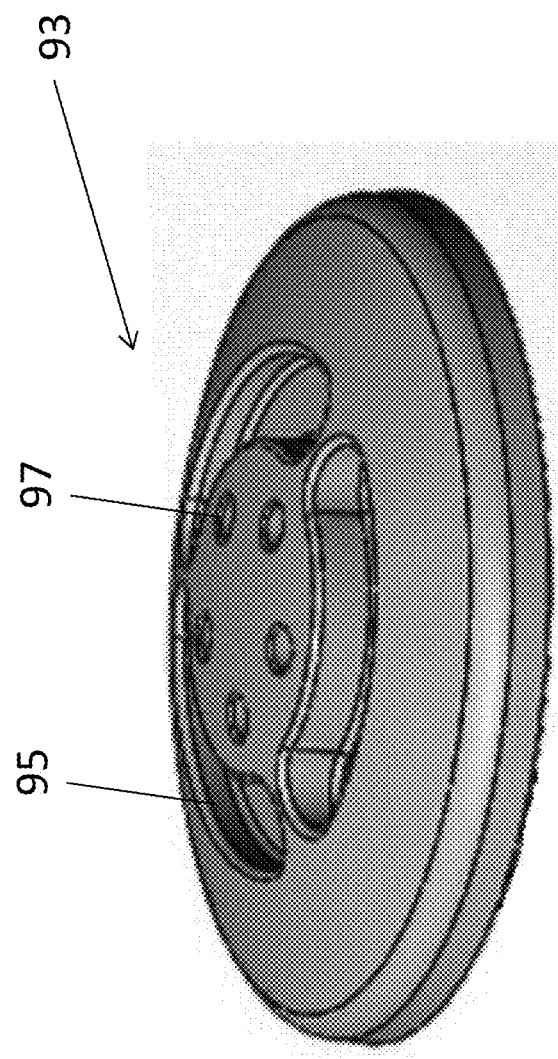
FIG. 17 shows a perspective view of a lid for use with the hopper shown in FIG. 13.

FIG. 17 shows a perspective view of a lid 93 for use with the hopper 3 shown in FIGS. 13 to 16. The lid 93 includes a plurality of radial slots 95 that allow for the lid 93 to be gripped by a user and removed from the hopper 3. In addition, the lid 93 includes a plurality of ventilation apertures 97 that align with the cylinder 81 of the hopper 3 and allow for ventilation of the motor 21. This enables heat generated by the motor 21 to be removed from the hopper 3. In an alternate embodiment, the ventilation apertures 97, or the cylinder 81 itself, is connected to a fan (not shown) to force heat generated by the motor 21 from the hopper 3.

In the claims which follow and in the preceding summary except where the context requires otherwise due to express language or necessary implication, the word "comprising" is used in the sense of "including", that is, the features as above may be associated with further features in various embodiments. Variations and modifications may be made to the parts previously described without departing from the spirit or ambit of the disclosure.

The invention claimed is:

1. An apparatus for discharging ground coffee beans comprising:
   a first container for the retention of coffee beans therein, the first container having a first aperture arranged to receive coffee beans therethrough, and an opposing second aperture arranged to dispense coffee beans therethrough;
   a conical burr grinder arranged to grind the coffee beans dispensed through the second aperture of the first container;
   a motor arranged to drive the conical burr grinder, the motor being disposed within the first container and above the conical burr grinder, wherein the positioning of the motor within the first container is such that there is an evenly distributed weight of the coffee beans retained within the first container on the conical burr grinder;
   a motor support portion disposed within and concentric with the first container, the motor support portion being arranged to support the motor directly above the conical burr grinder and to separate the motor from the coffee beans retained within the first container, wherein the motor is centrally positioned within the motor support, and wherein the motor, the motor support and the first container are coaxially aligned; and
   the conical burr grinder configured to vertically discharge the ground coffee beans, wherein the motor, the motor support and the first container are axially spaced from the conical burr grinder; and
   the apparatus further comprising a second container supported vertically below the conical burr grinder to receive the vertically discharged ground coffee beans from the conical burr grinder; and
   the apparatus further comprising a motor shaft partially contained within the motor support and extending through a lower opening of the motor support into the first container.

2. The apparatus as claimed in claim 1 further comprising a removable lid arranged to cover the first aperture of the first container, wherein the lid comprises a plurality of ventilation apertures formed therethrough, the ventilation apertures being aligned with the motor support portion to allow for heat generated by the motor to be released from the first container.

3. The apparatus as claimed in claim 1, wherein the second container is supported by the apparatus at a position whereby the second container is configured to receive a direct and unrestricted flow of the ground coffee beans upon rotation of the conical burr grinder.

4. The apparatus as claimed in claim 1, further comprising the second container in the form of a portafilter, wherein coffee beans vertically discharged from the conical burr grinder are received by the portafilter.

5. The apparatus as claimed in claim 1 further comprising a channel, the channel being arranged to receive the ground coffee beans discharged by the conical burr grinder and deliver the ground coffee beans to the second container.

6. The apparatus as claimed in claim 1, wherein the conical burr grinder comprises two conical burrs that are adjustable to vary the distance between them, adjustment of the conical burrs causing the ground coffee beans to vary in fineness.

7. The apparatus as claimed in claim 6, further comprising a worm gear assembly to vary the distance between the two burrs, the worm gear assembly comprising an elongate threaded stem that protrudes from the conical burr grinder such that a user can manually rotate the stem to cause the distance between the burrs to vary, the worm gear assembly further comprising teeth disposed about a periphery of a component of the conical burr grinder, the teeth being arranged to co-operate with the threads of the elongate stem, which engagement causes the component to in turn act on the conical burr to vary the distance between the two burrs when the elongate stem is rotated.

8. The apparatus as claimed in claim 1, wherein the motor shaft is:
   mechanically coupled so as to mechanically power a powered shaft, whereby rotation of the motor shaft is translated to the powered shaft to inturn engage and rotate at least one of the conical burrs; or
   magnetically coupled so as to power the powered shaft, whereby rotation of the motor shaft is translated to the powered shaft to inturn engage and rotate at least one of the conical burrs.

9. The apparatus as claimed in claim 8, wherein the mechanical coupling is configured to allow the first container to be removable from the apparatus, and wherein the mechanical coupling comprises a female portion mounted to the powered shaft that receives a male portion mounted to the motor shaft, the male and female portions having co-operating teeth that engage to rotate the conical burr upon rotation of the motor shaft.

10. The apparatus as claimed in claim 1, wherein the motor support portion comprises a support cylinder that separates coffee beans disposed within the first container from the motor.

11. The apparatus as claimed in claim 1 further comprising a slidable gate between the first container and the conical burr grinder, the slidable gate operable to close the second aperture of the first container.

12. The apparatus as claimed in claim 1 further comprising a scale arranged to weigh the discharged beans in the second container, the scale being positioned in the apparatus adjacent to where the beans are discharged into the container, whereby the beans discharged into the container are able to be weighed immediately following discharge.

13. The apparatus as claimed in claim 12, wherein the scale is positioned in the apparatus:
   such that the second container is located on the scale as the beans are discharged into the second container; or
   laterally adjacent to the second container when the beans are being discharged into the second container.

14. The apparatus as claimed in claim 12, wherein the scale and the motor are powered by the same power source, and wherein, when the scale is positioned in the apparatus such that the second container locates thereon during discharge, the scale is in the form of a ring, with the second container being supported by at least two tabs that are positioned on the ring.

15. The apparatus as claimed in claim 14, wherein, when the scale is positioned laterally adjacent to the second container, the second container is supported by a collapsing fork arranged to releasably engage the second container.

16. The apparatus according to claim 1, wherein the first container has at least one indicia positioned thereat, the indicia able to provide a visual guide to ensure that a correct quantity of coffee beans is retained within the first container.

17. The apparatus according to claim 1 further comprising:
a body defining an interior chamber and having the conical burr grinder disposed therein, the conical burr grinder being arranged to grind the coffee beans dispensed by the first container; and
a heat extraction assembly for extracting heat from the body, the heat extraction assembly comprising an air inlet in the body that is arranged to direct air into the chamber and onto the conical burr grinder, and a fan that is arranged to discharge that air from the body.

18. The apparatus as claimed in claim 17, wherein the air inlet is arranged such that the air is able to flow past and remove heat from the conical burr grinder, and the fan is arranged in the body to discharge the resultant heated air from the body, the air inlet comprising opposing slots located in the body and adjacent to the conical burr grinder, the opposing slots allowing ambient air to flow into the chamber from opposite sides of the apparatus.

19. The apparatus as claimed in claim 17, wherein the heat extraction assembly further comprises:
heat exchange fins disposed radially around and in contact with an external surface of the conical burr grinder, the fins able to conduct heat from the conical burr grinder, and
an aperture in an external surface of the conical burr grinder support body that is arranged to support and surround the conical burr grinder, the aperture enabling air to flow from the chamber to an interior of the conical burr grinder support body, whereupon the air can be heated to remove heat from the conical burr grinder.

20. The apparatus as claimed in claim 17, wherein the fan is located in the chamber and adjacent to an air outlet disposed in a wall of the body, the fan able to exhaust the heated air through the air outlet, the fan being controllable to vary its speed to increase or decrease airflow through the chamber.

* * * * *